United States Patent [19]

Cantele

[11] Patent Number: 4,580,607

[45] Date of Patent: Apr. 8, 1986

[54] BUCKET AND STOOL COMBINATION

[76] Inventor: Fred J. Cantele, Rte. 1, Box 612, Summerfield, Fla. 32691

[21] Appl. No.: 650,443

[22] Filed: Sep. 13, 1984

[51] Int. Cl.⁴ ............................................. A45C 5/00
[52] U.S. Cl. .................................... 150/48; 220/4 C; 220/4 D; 220/DIG. 6; 297/217
[58] Field of Search ................ 150/48; 220/1 C, 4 C, 220/4 D, DIG. 6; 297/217; 206/509

[56] References Cited

U.S. PATENT DOCUMENTS

| | | | |
|---|---|---|---|
| 608,806 | 8/1898 | Thompson | 220/4 C |
| 1,864,874 | 6/1932 | Voight | 220/DIG. 6 |
| 2,678,861 | 5/1954 | Funk | 206/509 |
| 3,273,739 | 9/1966 | Wei | 206/509 |
| 3,369,691 | 2/1968 | Wei | 206/509 |
| 3,384,259 | 5/1968 | Hoffstadt | 220/4 D |
| 3,410,438 | 11/1968 | Bartz | 220/1 C |
| 4,010,863 | 3/1977 | Ebel | 220/1 C |
| 4,054,184 | 10/1977 | Marcinko | 220/1 C |
| 4,295,680 | 10/1981 | Grasso | 297/217 |
| 4,379,587 | 4/1983 | Duncan | 297/217 |
| 4,386,700 | 6/1983 | Deaton | 220/1 C |
| 4,405,048 | 9/1983 | Peake | 220/DIG. 6 |
| 4,415,077 | 11/1983 | Murphy | 220/4 C |
| 4,418,829 | 12/1983 | Clay | 220/1 C |

FOREIGN PATENT DOCUMENTS 1540627 4/1968 France .................... 220/DIG. 6

Primary Examiner—Joseph Man-Fu Moy
Assistant Examiner—David Fidei

[57] ABSTRACT

This bucket and stool assembly is unique in design, for making its user's work much easier. Primarily, it includes a stool which serves as a place of storage for washing equipment, when not being used as a stool. It also includes projections on the small diameter portions of the assembly for locking the two units together.

3 Claims, 5 Drawing Figures

BUCKET AND STOOL COMBINATION

SUMMARY OF THE INVENTION

This invention relates to containers, and more particularly, to a bucket and stool combination.

The principal object of this invention is to provide a bucket and stool combination, which will be unique in design, in that it will be a two piece assembly, having the bucket portion a comfortable height, so as to prevent the user having to bend to wet the washing equipment being used.

Another object of this invention is to provide a bucket and stool combination, which will be of such design, as to have the stool portion at the user's convenience when needed, and the stool acts as a container for washing equipment.

A further object of this invention is to provide a bucket and stool combination, which will be of such design, as to lock together by simple locking means.

Other objects are to provide a bucket and stool combination, which is simple in design, inexpensive to manufacture, rugged in construction, easy to use, and efficient in operation.

These, and other objects, will be readily evident, upon a study of the following specification, and the accompanying drawing, wherein:

DESCRIPTION OF THE PREFERRED EMBODIMENT

Figure 1:
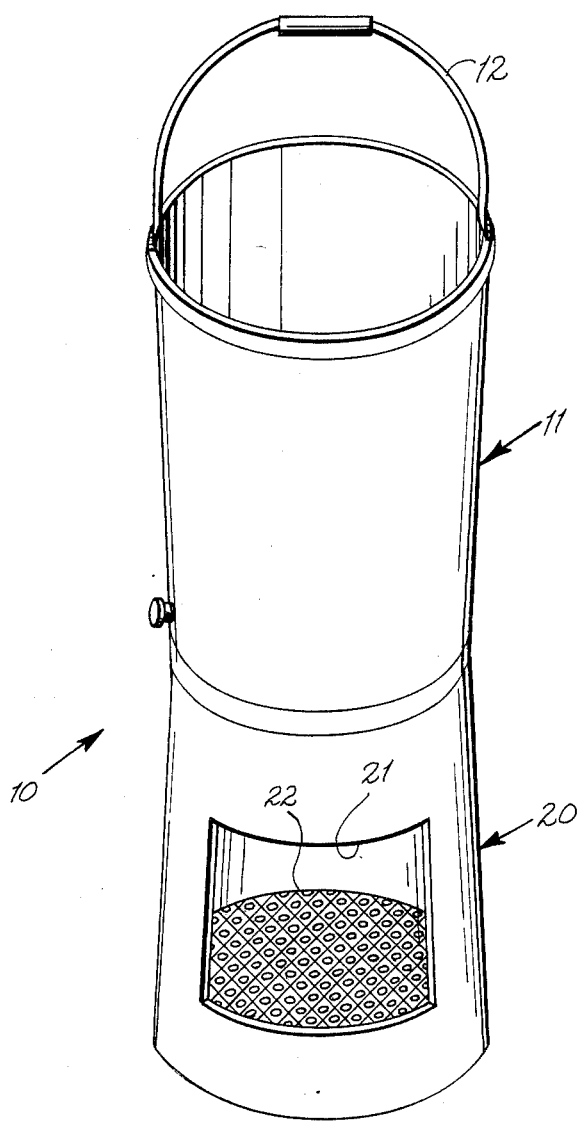
FIG. 1 is a perspective view of the present invention.
Figure 2:
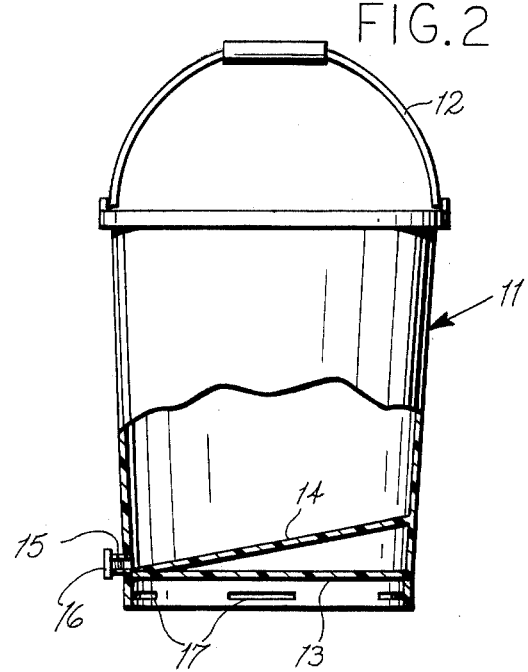
FIG. 2 is a side elevational view of the bucket portion, shown partly broken away.
Figure 3:
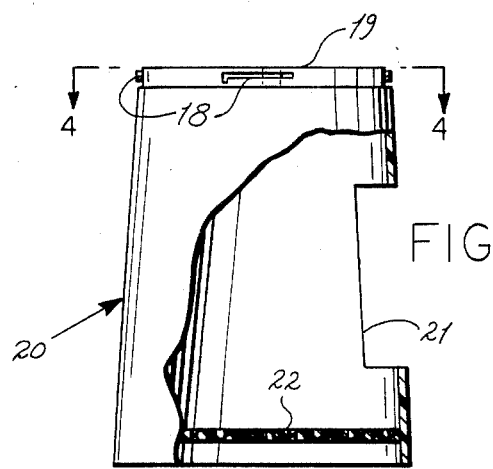
FIG. 3 is a side elevational view of the stool portion of the invention, shown partly broken away.
Figure 4:
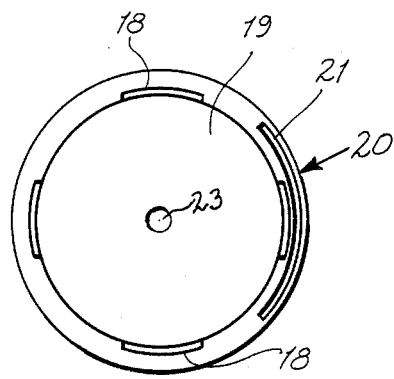
FIG. 4 is a view taken along the line 4—4 of FIG. 3.
Figure 5:
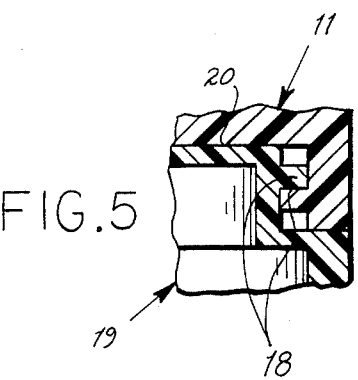
FIG. 5 is an enlarged fragmentary cross-sectional view of the bucket and stool, in locked condition.

Accordingly, an assembly 10 is shown to include a bucket 11, having a typical handle 12. A recessed bottom wall 13 is integrally attached thereto, and a second wall 14 is angularly sloped downward towards wall 13, and is similarly attached. A drain-cock 15 is also provided in the wall of bucket 11, and includes a suitable plug 16, and the wall 14 serves to prevent having to tip bucket 11 when it needs to be emptied. A plurality of equally spaced projections 17, on the interior of the bottom inner surface of bucket 11, are integrally attached thereto, and serve as locking means for the assembly 10, when engaged with similar projections 18 on the outer periphery of the bottom wall 19 of stool 20. The bottom of stool 20 is smaller in diameter than the bottom of bucket 11, so as to enable the two to fit one within the other, and the projections 17 and 18 slidingly engage with each other by a simple one quarter turn of either the bucket 11, or the stool 20.

A cut-out opening 21 is provided in the side of stool 20, for the placement and storage of washing equipment (not shown), and a perforated wall 22 is fixedly secured at its outer periphery, in a suitable manner, to the inner periphery of the large diameter portion of stool 20, for drainage of water or other fluid. A central opening 22 is also provided in wall 19, for drainage, and it shall be noted, that bucket 11 and stool 20 are fabricated of a suitable plastic material, and the walls 13, 14, and 22 may also be fabricated of same, if desired.

In use, bucket 11 and stool 20 are interlocked by engaging the projections 17 and 18 thereof, with each other, by rotating either 11 or 20, one quarter turn. The assembly 10 is then placed with the stool 20 on the ground or other surface, for storage. When it is desired, the reverse procedure is used to separate assembly 10, and stool 20 may be sat upon, while washing equipment in bucket 11. When it is desired to drain water or fluid from bucket 11, the plug 16 is removed from the draincock 15 and the fluid drains out, by the wall 14 being angularly disposed. After draining, the plug 16 is replaced. When finished, the bucket 11 and stool 20 are again placed together, and equipment is placed in the opening 21 of stool 20, where it is supported upon wall 22.

While various changes may be made in the detail construction, it is understood that such changes will be within the spirit and scope of the present invention, as is defined by the appended claims.

What I claim is:

1. A combination bucket and stool for cleaning purposes comprising:
   (a) a bucket having a cylindrical side wall open at one end and closed at the opposite end by a recessed bottom wall located at the bottom portion of said bucket and spaced inwardly from the bottom edge of said cylindrical side wall,
   (b) a stool adapted to interlock with said bucket, said stool defining a receptacle comprising a cylindrical side wall, an integral bottom wall and perforated wall opposite said bottom wall, said stool further comprising an opening is said stool cylindrical side wall for placement and removal of articles within said stool,
   (c) said bottom portion of said bucket having a diameter greater than said stool bottom wall permitting said stool to be nested with said bucket and retained by an interlocking means.

2. The combination bucket and stool according to claim 1 wherein said interlocking means comprises a plurality of projections located in the bottom portion of said bucket and a plurality of projections located adjacent said bottom wall of said stool, said projections being arranged to form a rotatable interlock between said bucket and said stool.

3. The combination bucket and stool according to claim 1 wherein said bucket further comprises a second wall angularly sloped relative to said recessed bottom wall, said second wall being arranged to communicate with a draincock located in said cylindrical side wall of said bucket.

* * * * *